219-121

8/4/81 OR 4,282,418 SR

United States Patent [19]

Wuestner

[11] 4,282,418

[45] Aug. 4, 1981

[54] PLASMA TORCH FOR MICRO-PLASMA WELDING

[75] Inventor: Friedrich Wuestner, Wolfratshausen, Fed. Rep. of Germany

[73] Assignee: Siemens Aktiengesellschaft, Berlin & Munich, Fed. Rep. of Germany

[21] Appl. No.: 53,686

[22] Filed: Jul. 2, 1979

[30] Foreign Application Priority Data

Sep. 11, 1978 [DE] Fed. Rep. of Germany ....... 2839485

[51] Int. Cl.[3] .............................................. B23K 9/00

[52] U.S. Cl. ........................ 219/121 PP; 219/121 PR; 219/121 PQ; 219/121 PS; 219/75

[58] Field of Search ................. 219/121 P, 121 R, 74, 219/75, 76.16, 76.11, 76.15; 313/231.4, 231.5

[56] References Cited

U.S. PATENT DOCUMENTS

| | | | |
|---|---|---|---|
| 3,390,292 | 6/1968 | Perugini | 219/75 X |
| 3,450,926 | 6/1969 | Kiernan | 219/121 P |
| 3,571,556 | 3/1971 | Wustner | 219/121 P |
| 3,585,434 | 6/1971 | Kato | 219/121 P |
| 3,690,567 | 9/1972 | Bornerman | 219/121 P |
| 3,830,428 | 8/1974 | Dyos | 219/121 P |
| 4,140,892 | 2/1979 | Muller | 219/75 |
| 4,146,654 | 3/1979 | Guyonnet | 219/121 P |

FOREIGN PATENT DOCUMENTS

| | | | |
|---|---|---|---|
| 1271852 | 7/1968 | Fed. Rep. of Germany | 219/121 P |
| 250339 | 8/1977 | U.S.S.R. | 219/121 P |

*Primary Examiner*—Gene Z. Rubinson
*Assistant Examiner*—Mark H. Paschall
*Attorney, Agent, or Firm*—Hill, Van Santen, Steadman, Chiara & Simpson

[57] ABSTRACT

A plasma torch for micro-plasma welding which has a hollow cylindrical torch housing, an electrode supported in the housing and insulated therefrom, a plasma nozzle having a cooling chamber and a plasma channel mounted in the housing adjacent the end of the electrode, an inert gas nozzle arranged concentrically around the plasma nozzle and various lines and connections for supplying plasma gas, inert gas and a welded current as well as lines for applying a cooling agent to the cooling chamber of the plasma nozzle characterized by the plasma channel of the plasma nozzle having a raised annular edge facing the electrode, which has a large diameter and terminates in a point and is provided with its own cooling chamber. This structure enables the welding torch to withstand high continuous loadings during series fabrication, reduces wear, and provides increased heat dissipation. Preferably, the torch is also provided with a diffusion-tight plasma gas supply line which improves the life of the torch.

7 Claims, 4 Drawing Figures

PLASMA TORCH FOR MICRO-PLASMA WELDING

BACKGROUND OF THE INVENTION

The present invention is directed to a plasma torch for micro-plasma welding which torch has a hollow cylindrical torch housing, an electrode supported at one end of the housing and insulated therefrom, a plasma jet or nozzle provided with a cooling chamber arranged adjacent the electrode, an inert gas jet or nozzle arranged concentrically around the plasma jet and various connections and lines for supplying plasma gas, inert gas, welding current and also tubes and lines for delivery and removal of a cooling agent to the plasma nozzle.

A plasma torch which has a cylindrical housing having a structure for supporting an electrode in the housing and insulating it therefrom and having a plasma nozzle or jet mounted on one end of the housing adjacent the end of the electrode, with an inert gas nozzle or jet being disposed concentrically to the plasma jet is known and an example is disclosed in German Letters Patent No. 1,806,858. In this known type of torch, which is usually used in micro-plasma welding, the electrode is a pin-shaped electrode, which is relatively thin and generally has a pin diameter of about 1 mm. Usually the design is such that the tip of the electrode will project into a funnel-shaped widening of the plasma channel of the plasma jet or nozzle with the funnel-shaped widening being provided for reasons of gas flow dynamics. However, since on the one hand, a stable focusing of the arc plasma cannot be achieved with this type of torch and, on the other hand, the torch is subjected to very high wear, it has been proven that the plasma torches of this type are not suitable for employment in a series manufacturing process. Since no defined focal spot is present in the torch, the unstable focusing of the plasma is caused by the flickering of the pilot light arc.

SUMMARY OF THE INVENTION

The present invention is directed to providing a plasma torch adapted for micro-plasma welding which torch has its smallest dimensions for current usage in the range of 0.1–20 . . . 50 A, which current usage is also up to the high continuous loading present in series fabrication. The torch of the present invention also has a stable focusing of the plasma and supplies a constant energy to ignite the plasma precisely.

To accomplish these goals, the present invention is directed to an improvement in a plasma torch having a hollow cylindrical torch housing; an electrode; means for mounting the electrode in the torch housing and insulating it therefrom; a plasma gas nozzle being disposed adjacent one end of the electrode and having a cooling chamber formed therein and a plasma channel for the plasma to pass therethrough; an inert gas nozzle being arranged concentrically around the plasma nozzle on said housing; separate means for supplying plasma gas to the plasma nozzle, inert gas to the inert gas nozzle, welding current to the electrodes; and a cooling agent to the cooling chamber. The improvement comprises the plasma channel of the plasma nozzle having a raised annular edge at an end facing toward the electrode, said electrode having an enlarged diameter tapering to a point, and cooling means for cooling the electrode.

The flickering of the pilot arc is prevented by means of the raised annular ring surrounding one end of the plasma channel, which end is adjacent to the electrode which ring defines a focal spot. Unfavorable influences on the plasma column are prevented by means of the pilot light arc, which now burns constantly. Suprisingly, no disadvantages with respect to the gas dynamics occur because of this new torch geometry.

Not only because of the construction of the plasma nozzle, but also because of the fact that the electrode is directly cooled such as by a direct water cooling and because of the cross section of the electrode, an optimum heat dissipation and thus cooling of the electrode is achieved. Thus the erosion point of the electrode is significantly reduced. Therefore, the loadability and endurance of the plasma jet and of the electrode of the torch is increased by a multiple.

Preferably, the torch exhibits a dual circuit cooling system wherein the one cooling system is allocated to the annular cooling chamber of the plasma jet or nozzle and the other circuit is connected to the direct cooling of the electrode. The subdivision of the cooling system into two separate cooling circuits prohibits undesirable electrical currents in the cooling water and thus a possible electrolytic destruction of the torch. By means of these features, the torch can now be operated with a relatively high pilot current of approximately 10 A instead of the usual current of 2 A. The relatively high pilot current produces a thermalization for the plasma which is better by a multiple and which will exclude misfirings.

According to a further feature of the invention, the torch has a diffusion-tight plasma gas supply line. Preferably, the plasma gas is supplied to the torch through a diffusion-tight metal corrugated tube. It is proven that the previously employed synthetic or rubber hoses do not completely meet this demand. Up to now, oxidation and erosion of the electrode, which are usually tungsten, was greatly accelerated by means of the diffusion of oxygen from the atmosphere into the plasma gas, which is usually argon, because of the partial pressure differences. The results were an early inability of the electrode to fire and problems in focusing disruptions of the plasma beam, which usually occur before the inability of the electrode to fire.

DESCRIPTION OF THE PREFERRED EMBODIMENTS

Figure 1:
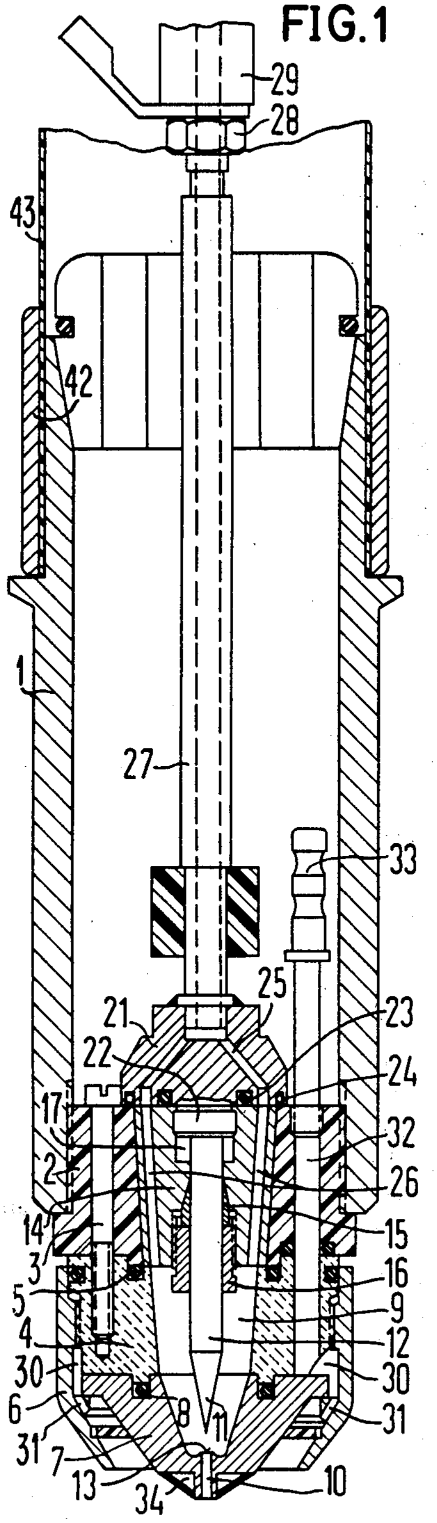
FIG. 1 is a cross section with portions in elevation for purposes of illustration of a plasma torch according to the present invention.

The principles of the present invention are particularly useful in a plasma torch which is illustrated in FIG. 1 and includes a generally cylindrical housing 1, which receives means for mounting an electrode 12 which means includes an annular insulating member or bushing 2, which is provided with external threads for threading into the one end of the housing 1. An annular-shaped torch part 4 is fastened on the annular member 2 by a threaded fastener such as screws 3 and is sealed thereto by the aid of an O-ring 5.

An annular-shaped plasma jet or nozzle 7 is pressed against the torch part 4 by the assistance of an inert gas jet or nozzle 6, which is designed as a sleeve type member threaded onto the external threads of the member 4. The nozzle 7 has a plasma channel 10 which extends into a conical passage that is axially aligned with an axial passage or bore of the torch part 4 to form a plasma chamber 9 and part 4 and nozzle 7 are sealed together with the aid of an O-ring seal 8. The plasma channel 10, which is axially aligned with the chamber 9, is axially aligned with a point 11 of the electrode 12 which is axially mounted in chamber 9. The channel 10 at an end facing the point 11 is provided with a raised annular edge 13, which preferably has the form or shape in cross section of a truncated cone. As illustrated, the point 11 of electrode 12 is at its closest proximity to the annular edge 13 than any other portion of the surface of the electrode 12 to the surface of the nozzle 7 so that the annular lip 13 provides or defines a focal spot which will prevent a flickering of the pilot arc.

The means for mounting or supporting the electrode includes a seat or first member 14, which is received in the annular insulating member or bushing 2. The electrode 12 is held in a bore in the seat or first member 14 by a conical metal ring 15, which is received in a conical portion of the bore and is held in the conical portion by a threaded bushing 16, which is threaded into a threaded portion of the bore. The metal ring 15, which is preferably a bronze ring, and the corresponding conical bore as well as the bore for the electrode 12 have a narrow or small tolerance so that the metal ring can engage the surface of the conical portion and the electrode with elastic deformation to form a seal. This is important because the upper end of the electrode 12 is directly contacted by a cooling agent and it is undesirable for the cooling agent to penetrate into the plasma chamber 9.

Figure 2:
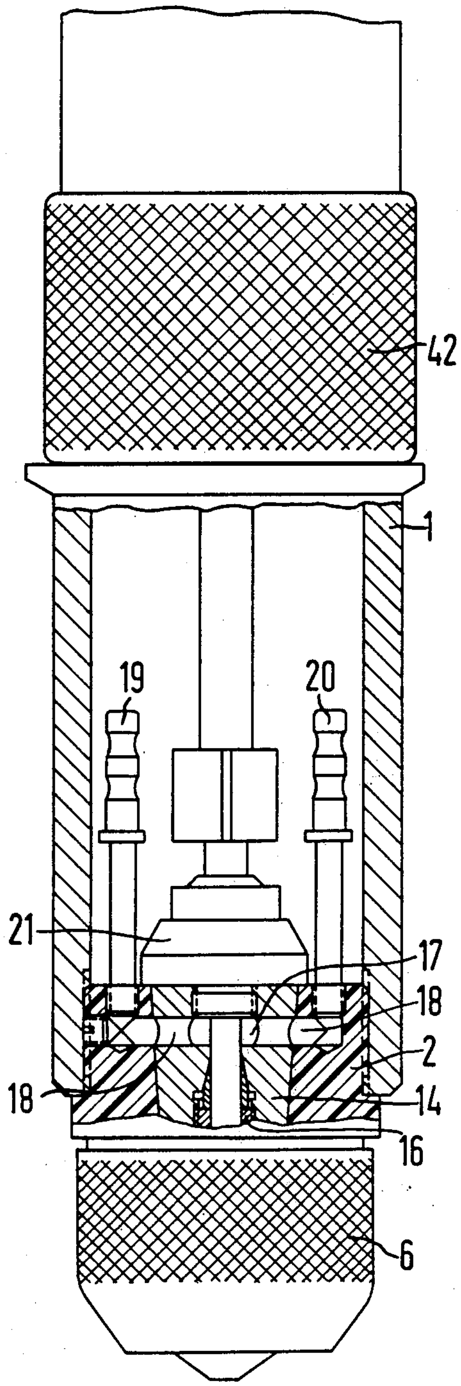
FIG. 2 is a partial cross section with portions in elevation for purposes of illustration of a torch of FIG. 1 rotated on the axis of the torch by approximately 62°.

To provide cooling means for the electrode, the member 14 is provided with a bore forming an annular channel 17, which surround a portion of the electrode 12. To provide a cooling agent to the annular channel 17, it is in communication with a radially extending passage 18 that passes through the member 14 (FIG. 2) and into opposite sides of the annular insulating member 2. A water connection such as 19 and 20 extends into the insulating bushing or annular insulating member 2 and is in communication with each of the passages 18. One of the two connections 19 and 20 is connected to a water supply line and the other of the two connections 19 and 20 is connected to a water discharge line.

As illustrated in FIG. 1, a torch head 21 is provided with a screw neck 22, which is screwed or threaded into a corresponding threaded bore of the member 14. To provide adequate seals, an O-ring 23 is interposed between the member 21 and 14 and an O-ring 24 is placed between the surface of the member 21 and the insulating member 2. The torch head 21 has bores 25 for supplying a plasma gas to the chamber 9 via channels 26 in the first member 14. To supply a plasma gas to the channel or passage 25, the passage 25 is in communication with a stationary tube 27, which is screwed into the torch head 21 and is connected with a diffusion-tight plasma gas supply line 29 by a connection piece 28. Preferably, a diffusion-tight metal corrugated tube is utilized or employed.

The inert gas is supplied to the inert gas nozzle 6 by inert gas channel 30, which is connected or in communication on the one side to the outside of the plasma nozzle 7 by bores 31 and in communication at the other end with an inert gas connection 33 by a bore 32 which extends through the insulating member 2 and the part 4.

Figure 3:
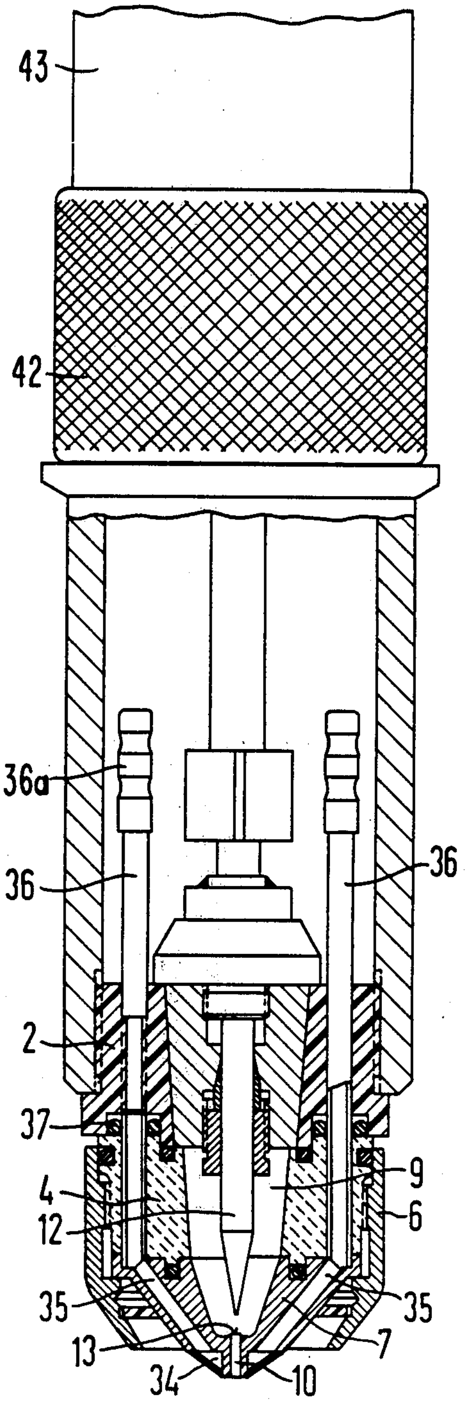
FIG. 3 is a partial cross section through the torch of FIG. 1 rotated on the axis of the torch by approximately 90° of FIG. 1.
Figure 4:
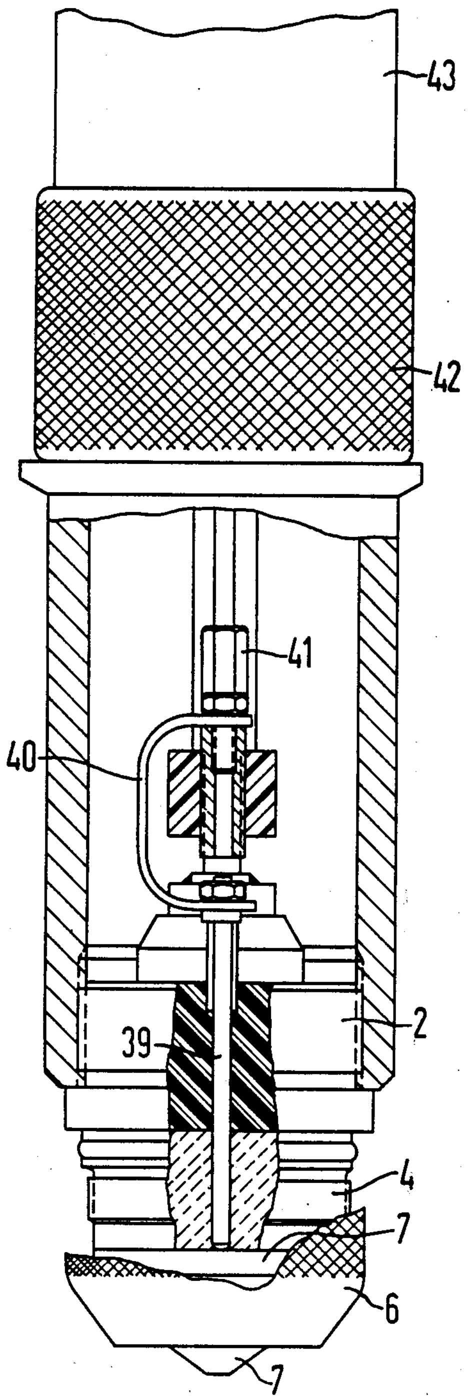
FIG. 4 is a partial cross section with portions broken away for purposes of illustration showing the electrical connection for the plasma nozzle.

As best illustrated in FIG. 3, the plasma nozzle 7 also has an annular cooling chamber 34 which is provided near the plasma channel 10. The cooling chamber 34, which surrounds a portion of channel 10, is connected with a cooling agent intake and discharged by bores 35 which are in communication with tubes 36 which are provided with connecting necks such as 36a. The tubes 36 are inserted through bores in the insulating member 2 and into bores in the torch part 4. The tubes 36 are connected by their necks 36a to approxiate cooling agent hoses which are not illustrated. The cooling agent circulation for the nozzle 7 is illustrated as being sealed both from the chamber 9 and from the outside of the torch by O-rings such as 37.

To provide current to the anode connection, electrode 39 is provided. The electrode or head 39 for the anode connection to the plasma nozzle 7 provides a connection to the source of pilot current and extends from the nozzle 7 through a bore in the insulating bushing 2 and the annular-shaped torch part 4. The supply is connected to the electrode 39 by an elastic member 40 which has a bower shape. The bowed member 40 has one end connected to the electrode 39 and the other connected to a positive pole of a pilot current source via a connection 41. The negative pole of the pilot current souce is connected to the electrode 12 in a known manner.

An elastic protective tube 43 is attached to the torch housing by means of a threaded sleeve such as 42.

Although various minor modifications may be suggested by those versed in the art, it should be understood that I wish to embody within the scope of the patent granted hereon, all such modifications as reasonably and properly come within the scope of my contribution to the art.

I claim:

1. In a plasma welding torch particularly adapted for micro-plasma welding, said torch having a hollow cylindrical torch housing; a pin-shaped electrode terminating in a point; means for mounting the electrode in the torch housing and insulating it therefrom; a plasma gas nozzle being disposed adjacent the point of the electrode and having a cooling chamber formed therein and a plasma channel for the plasma to pass therethrough; an inert gas nozzle being arranged concentrically around the plasma nozzle on said housing; and separate means for supplying plasma gas to the plasma nozzle, inert gas to the inert gas nozzle, welding current to the electrodes, and a cooling agent to the cooling chamber the improvements comprising said pin-shaped electrode having an enlarged diameter cylindrical surface tapering to said point; the plasma channel of the plasma nozzle having a raised annular edge at an end facing toward the point of the electrode so that the closest proximity between the electrode and the nozzle is between the annular edge and the point; cooling means for cooling the electrode including means contacting a portion of the cylindrical surface of the electrode; and said means for mounting the electrode including a passage in a member for receiving the electrode, said passage having a conical portion expanding into a threaded portion, and means for sealing said electrode in said passage, said means for sealing including a conical metal ring having small tolerances disposed in the conical passage, a threaded bushing threaded into said threaded portion to force the conical metal ring into sealing engagement with the conical portion and the cylindrical surface.

2. In a plasma welding torch according to claim 1, wherein the conical metal ring is a bronze ring.

3. In a plasma welding torch according to claim 1, wherein the means for supplying a plasma gas to the plasma nozzle includes a diffusion-tight plasma gas supply line.

4. In a plasma welding torch according to claim 3, wherein said plasma supply line comprises a metal corrugated tube.

5. In a plasma welding torch according to claim 1, wherein the annular edge has a cross section of a truncated cone extending toward the point of the electrode.

6. In a plasma welding torch according to claim 1, wherein the means for cooling the electrode is a separate circuit from a cooling circuit for the cooling chamber of the plasma nozzle.

7. In a plasma welding torch according to claim 1, wherein the means for mounting the electrode includes the first mentioned member being disposed in an annular insulating member, and said cooling means for the electrode including an annular channel formed in said first member to surround and contact the portion of the electrode, a pair of radial channels extending from the annular channel into the annular insulating member, a connection extending axially in the housing from each of said radial channels in said insulating member with one connection being with a supply of cooling agent and the other connection with a discharge line for the cooling agent.

* * * * *